(12) United States Patent
Hoffmeister

(10) Patent No.: US 10,847,989 B2
(45) Date of Patent: Nov. 24, 2020

(54) CONSUMER ARRANGEMENT AND OPERATING METHOD

(71) Applicant: Robert Bosch GmbH, Stuttgart (DE)

(72) Inventor: Fabian Hoffmeister, Schoenau (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 16/202,321

(22) Filed: Nov. 28, 2018

(65) Prior Publication Data

US 2020/0169109 A1 May 28, 2020

(51) Int. Cl.
*H02J 7/00* (2006.01)
*H02J 7/02* (2016.01)
*H02M 1/42* (2007.01)
*H02J 3/01* (2006.01)

(52) U.S. Cl.
CPC ............. *H02J 7/022* (2013.01); *H02J 3/01* (2013.01); *H02J 7/007* (2013.01); *H02M 1/4241* (2013.01)

(58) Field of Classification Search
CPC .. H02J 7/022; H02J 3/01; H02J 7/007; H02M 1/4241
USPC .......................................................... 320/107
See application file for complete search history.

(56) References Cited

U.S. PATENT DOCUMENTS

| | | | | |
|---|---|---|---|---|
| 5,559,688 A * | 9/1996 | Pringle | ............... | H02M 1/4241 363/84 |
| 5,804,951 A * | 9/1998 | Rivet | .................. | H02M 1/4208 323/223 |
| 9,496,782 B2 * | 11/2016 | Eckel | ....................... | H02M 1/42 |
| 10,680,510 B2 * | 6/2020 | Elferich | ............ | H02M 3/33569 |
| 10,680,530 B2 * | 6/2020 | Cheng | .................... | H02M 5/293 |
| 2008/0273356 A1 * | 11/2008 | Melanson | ........... | H02M 1/4225 363/47 |
| 2012/0106206 A1 * | 5/2012 | Tang | .................... | H02M 1/4258 363/21.02 |
| 2012/0313614 A1 * | 12/2012 | Ohshita | ............... | H02M 3/1584 323/311 |
| 2013/0162224 A1 * | 6/2013 | Eckel | ..................... | H05B 45/37 323/205 |
| 2013/0169517 A1 * | 7/2013 | Cho | ....................... | G09G 3/3208 345/82 |
| 2017/0018960 A1 * | 1/2017 | Beg | ........................ | H02J 7/0068 |

(Continued)

FOREIGN PATENT DOCUMENTS

DE       102010063126       6/2012

*Primary Examiner* — Suresh Memula
(74) *Attorney, Agent, or Firm* — Michael Best & Friedrich LLP

(57) ABSTRACT

In a consumer arrangement (2) with a power supply (4) with power supply input (6), with a consumer (10) which is supplied with an output power (A) by the power supply (4), wherein the power supply (4) contains a PFC module (12) with a DC link (14), wherein the PFC module (12) contains a regulator (16) for supplying the DC link (14), a characteristic parameter (K) correlated with the output power (A) required by the consumer (10) is fed back into the regulator (16).
In a method for operating a consumer arrangement (2) with a power supply (4), with a consumer (10) which is supplied with an output power (A) by the power supply (4), wherein the power supply (4) contains a PFC module (12), wherein the PFC module (12) contains a regulator (16), a characteristic parameter correlated with the output power (A) required by the consumer (10) is fed back into the regulator (16).

16 Claims, 2 Drawing Sheets

(56) References Cited

U.S. PATENT DOCUMENTS

| | | | |
|---|---|---|---|
| 2017/0302214 A1* | 10/2017 | Marcinkiewicz | F04B 35/04 |
| 2018/0166976 A1* | 6/2018 | Jiang | H02M 1/4258 |
| 2018/0170203 A1* | 6/2018 | Jang | B60L 53/62 |
| 2019/0058393 A1* | 2/2019 | Elferich | H02M 3/335 |

* cited by examiner

CONSUMER ARRANGEMENT AND OPERATING METHOD

BACKGROUND OF THE INVENTION

Due to increasingly stringent regulatory requirements, more and more electronic devices contain devices which optimize the supply current consumed in terms of the harmonics contained therein. Conventionally designed switching power supplies usually for consumers usually have a rectifier and a smoothing capacitor. The latter is only charged when loaded by the consumer when the instantaneous value of the sinusoidal supply voltage rises above the DC potential of the smoothing capacitor. The consequence is only a short current pulse, which recharges the capacitor. The current waveform therefore does not exhibit many harmonics. Depending on the relevant standard, this may make approval or certification more difficult or even impossible.

The objective of a PFC circuit (Power Factor Correction) is to optimize the harmonics, the spectrum of which is evaluated via the power factor, in such a way that in addition to the fundamental (the current at 50 Hz), only a small number of harmonics are included. The power factor therefore describes the ratio of active power to apparent power consumed. In order to optimize this ratio, in a PFC the primary method is to regulate the supply current that is consumed.

It is known from patent DE 10 2010 063 126 A1 that in order to charge the high-voltage vehicle battery of a hybrid or electric vehicle via, for example, a public mains power supply, a charging device is required. Known charging devices for high-voltage vehicle batteries usually consist of a rectifier with line filter, a power factor correction (PFC) circuit and a potential separation device.

SUMMARY OF THE INVENTION

In the context of the invention a consumer arrangement is disclosed. Preferred or advantageous embodiments of the invention as well as other categories of the invention are obtained from the claims, the following description and the attached figures.

The consumer arrangement contains a power supply. The power supply contains a mains supply input. The mains supply input can be connected to a mains supply, wherein the mains supply provides an alternating voltage. The consumer arrangement contains a consumer. The consumer is connected to the power supply and (in operation) is supplied with output power by the power supply. The power supply contains a PFC module. The PFC module is connected to the mains supply input. The PFC module contains a DC link circuit. The DC link is supplied from the mains supply input (in operation). The DC link provides the output power (in operation). The PFC module contains a regulator. The regulator is used (in operation) to supply the DC link with the output power from the mains supply input. In other words, the regulator regulates this supply with regard to the transported quantity of energy or power. In the consumer arrangement a characteristic parameter is fed back to the regulator (in operation). The characteristic parameter is correlated with the output power required by the consumer. The correlation can be performed in a sufficiently well-known manner, e.g. by proportionality, any unique mapping rule, normalization, etc. For example, the characteristic parameter is the numerical value of the required output in Watt.

A "DC link" in the true sense is present in particular in a two-stage PFC-SMPS design (switched-mode power supply). A first stage is then a PFC with a DC link, a second stage is a main SMPS with galvanic isolation. This implementation is also possible in a single-stage approach, however. In this case, both power supply stages are merged into one. The classical DC link disappears and is shifted into the output capacitance of the power supply. In this sense, the term "DC link" here can also be understood as representing the "output circuit" described above. The same applies to the "DC link capacitance", which can then also be an "output capacitance".

In regular or normal operation, the power supply is therefore connected to the mains supply, wherein the mains supply provides the alternating voltage. The consumer is supplied with the output power. The PFC module is powered from the mains supply input and provides the output power. The regulator draws the output power from the mains supply input and feeds it into the DC link, the characteristic parameter is fed back to the regulator, the output power is provided either directly from the PFC module or an additional stage of the power supply. For example, in the power supply a main power supply is connected downstream of the PFC module before the consumer. In the present case, it is simplistically assumed that there are no power losses and the output power is therefore drawn from the mains supply in full, looped through the PFC module and possibly further components of the power supply, and absorbed by the consumer.

In accordance with the invention therefore, in the regulator of the PFC module a positive feedback of information takes place about the power absorbed by the consumer, which must be provided by the PFC module. In particular, the regulator adjusts the voltage in the DC link to a reference value, obtaining energy or power from the mains input and supplying it to the DC link. According to the invention therefore, the power required by the consumer is taken into account at the latest in the moment when it is needed, or even earlier (see below), so that the regulator can react to the change of performance requirements at the DC link very quickly or very early. This means this is not only possible when the voltage on the intermediate circuit breaks down or has already broken down. Standard regulators can only respond when the DC link voltage changes due to a load change in the consumer. Compared to a conventional regulator, which includes a pure feedback of the DC-link voltage to the regulator, the response time of the regulator to a change in the power demand of the consumer is improved.

This leads to an overall improved delivery of power by the power supply or PFC module in operation.

In a preferred embodiment the characteristic parameter is correlated with a demand by the consumer for output power, which is not expected until a time in the future after the expiry of a prediction time. In the (current) moment, in which the characteristic parameter is fed to the regulator or is taken into account in the regulator, a power consumption of the consumer which will occur in the future, delayed by the prediction time, is thus taken into account. Consequently, this results in a predictive, in other words anticipatory, regulation which can respond to expected power fluctuations before they occur. Prediction methods are adequately known from many different fields of technology, so that a suitable prediction method can be selected here. Specific examples for implementing such a prediction are explained below. The power supply can thus respond particularly efficiently to fluctuations of the power requirements of the consumer.

In a preferred embodiment a prediction time is in the range of tens of microseconds to tens of milliseconds. The prediction time is that time between the current usage time of the characteristic parameter in the regulator and the instant of the expected demand for output power. In particular, a fairly small range between thousands of microseconds and single-digit values of milliseconds applies. Such prediction times can be implemented particularly easily, especially in the embodiments mentioned below.

In a preferred embodiment the consumer has an input signal or can be fed with such a signal. The demand by the consumer is correlated with the input signal (its content). The characteristic parameter is then determined based on the input signal.

In this case, it is thus possible, simply by analysis or evaluation of the input signal fed to the consumer, to deduce both the current and a future demand by the consumer for output power, since this power is correlated with the signal. The information in the characteristic parameter is then correlated with the power requirement for the input signal which is processed, e.g. amplified, in the consumer, wherein the information is at least partly present in the input signal, for example in the form of its time waveform. The actual demand is then dependent only on the current gain. The corresponding embodiment is also applicable to input signals that are not known in advance prior to being fed to the consumer.

By identifying the characteristic parameter from the (current) input signal, a time advantage can then be obtained or a prediction implemented, if the demand by the consumer does not arise until after the input signal is already available for analysis. In particular, the demand only occurs in the consumer after a transit time has elapsed following the arrival of the input signal at the consumer. The characteristic parameter is then determined based on the input signal at least before the complete expiry of the transit time. Thus a prediction is already obtained, in other words a knowledge of the expected power output, before it actually occurs. Thus a prediction can be performed particularly simply. The prediction time in this case is the period between the determination of the characteristic parameter from the previously known input signal and the time of the actual demand for the output power (correlated with the temporally "delayed" input signal) in the consumer.

In a preferred alternative design of this embodiment, the input signal is one for which at least some sections are known in advance, i.e. before being fed to the consumer. The characteristic parameter is then determined in advance from the previously known input signal. Therefore, the demand for power in the consumer is known in advance by prediction. In particular, the respective demand can be determined fully in advance, for example if the input signal is an audio signal to be amplified that is reproduced from a data carrier and therefore already exists on the data carrier, hence is completely known (long) before the actual reproduction. Therefore, the audio signal can be analyzed and the corresponding demand predictively pre-calculated and thus fed to the regulator with a suitable lead time.

In a preferred alternative design of these embodiments, the input signal is a signal which is externally fed to the consumer arrangement. "Externally" means that this does not originate from within the consumer arrangement, in particular does not come from the power supply or is not correlated with the power supply, the input signal is thus only processed in the consumer. The consumer is, for example, an amplifier arrangement, designed to take an input signal and output it again, amplified and possibly time-delayed, as an output signal. As a result of the invention, such arrangements may also be operated advantageously.

In a preferred alternative design of these embodiments the consumer arrangement is an amplifier arrangement, in particular an audio amplifier arrangement, and the input signal is a signal, in particular an audio signal, to be amplified by the amplifier arrangement. The (audio) signal is thus fed to the (audio) amplifier and amplified and output by the amplifier again (possibly time-delayed).

In a preferred alternative design of this embodiment the characteristic parameter is one which is correlated with the expected output signal and therefore the output power of the input signal processed in the consumer. Because the type of processing in the consumer is usually known, it is possible to deduce the expected output signal and therefore the output power from the input signal. Here, also, for example, the output power of the amplifier arrangement must be assumed and the power demand for the amplified useful signal or input signal must be taken into account. The expected power consumption is then a function of the expected output power. Such relationships are particularly easily determined.

In a preferred alternative design of these embodiments the consumer includes a digital signal processor (DSP). The signal processor is located in a signal path for the input signal within the consumer. The signal processor has an internal transit time. This means that a signal which is fed into the signal processor leaves it after the transit time. The future demand for output power is then determined from the input signal that is at least not yet delayed by the full transit time. The consumption is then determined after a processing time which the input signal has spent between the infeed and its processing in the DSP. The rest of the transit time (transit time minus processing time) remains as a prediction time. After the prediction time the input signal leaves the DSP and is amplified, i.e. the output power is then required almost immediately.

In particular, the consumer is again an amplifier arrangement, which contains an amplifier and the DSP. The DSP is arranged upstream of the amplifier with respect to the input signal. In other words, at least a part of the processing time of the signal in the DSP is used as a prediction time in order to feed back advance information about the power demand of the amplifier in the PFC control system. In particular, the information for the characteristic parameter is extracted from the undelayed input signal, in other words from the topmost timing level of the DSP. The entire delay time in the DSP is then available as a prediction time for the PFC.

In a preferred embodiment the regulator has a reference input and an actual input. An actual value correlated with the current actual voltage in the DC link is fed to the actual input. A reference value correlated with the current reference voltage in the DC link is fed to the reference input. The reference value is determined on the basis of the characteristic parameter. The positive feedback of the characteristic parameter or the corresponding information it contains thus acts upon the reference value and is thus input to the regulator as positive feedback. The invention is thus particularly simple and inexpensive to implement. In particular—in the simplest case—the reference value is the reference value of the reference voltage and the actual value is the actual value of the actual voltage. Again, any mapping rules, scaling factors, normalizations etc. can also be applied as the correlation.

As part of the invention a method for operating a consumer arrangement is also disclosed. A consumer arrangement according to the invention is operated as the consumer arrangement, having a power supply with a mains supply input that can be connected to an electricity supply supplying an alternating voltage, with a consumer connected to the power supply, which is supplied with an output power by the power supply, wherein the power supply contains a PFC module connected to the mains supply input with a DC link, which is fed from the mains supply input and provides the output power, wherein the PFC module contains a regulator for supplying the DC link with the output power from the mains input, wherein a characteristic parameter correlated with an output power required by the consumer is fed back to the regulator.

The method and at least some of its embodiments, together with the respective advantages, have already been described mutatis mutandis in connection with the consumer arrangement according to the invention.

In a preferred embodiment of the invention, the method is implemented by means of the consumer arrangement or any of its embodiments.

The invention is based on the following findings, observations or considerations and has the following further embodiments. The embodiments of the invention are sometimes also referred to simplistically as "the invention". The embodiments can also contain parts or combinations of the above embodiments, or correspond to these and/or, where appropriate, also include embodiments not previously mentioned.

The invention is based on the recognition that in a conventional PFC the output voltage only plays a secondary role and for control engineering reasons, can only be regulated with a low dynamic response. By their nature, therefore, power supplies with PFC functionality usually have a comparatively slow transient behavior, are only able to compensate slowly for abrupt load changes at the output and react with sharp voltage dips and spikes. If the poor transient behavior of the PFC stage is not acceptable for the application, in many cases it is necessary to connect a second power supply stage with higher control dynamics between the PFC and the consumer.

In a modern audio amplifier the power supply can have a two-stage design, consisting of PFC and main power supply, which for reasons of cost and efficiency is often designed unregulated. Another possible implementation uses a single stage PFC.

If the amplifier is now required to deliver an abrupt change in power, this leads to a voltage dip at the output capacitor of the main power supply. This capacitor could of course use its own regulation (if in fact present) to keep the voltage dip to a minimum, but in any case it will abruptly draw a high current from the DC link capacitor. Due to the inherently low voltage regulation dynamics of the PFC, it can only react slowly to the new load situation. Inevitably there will be a sharp dip in the voltage on the DC link circuit. Depending on the main power supply topology, this can also cause problems for the main power supply, possibly even a collapse of the output voltage. The latter is a problem especially in unregulated main power supply topologies. These transmit the DC link voltage to the output voltage side with only a fixed transmission factor, and therefore also the load reductions of the DC link voltage.

The invention is based on the following idea: because a DSP in an amplifier knows the output power to be supplied (sometimes even before it occurs), the idea involves implementing positive feedback from the DSP to the PFC via a coupling path.

This signal is supplied for the regulation of the DC link voltage (feedback) and is fed back thereto. With optimum dimensioning the PFC will react to the changed load situation already before the start of the voltage dip and will significantly reduce the size of the dip.

The main distinctive feature of the invention lies in the prevention of the voltage dip at the DC-link capacitor. In order that the negative impact on the power factor of the circuit is not too strong, the feedback signal can be limited in some way. This can be achieved, for example, by a filtering of the signal. It would also be possible to activate the positive feedback only above a certain threshold.

However, the invention is usable in more general ways, the principle of the positive feedback of the output power can also be used in a wide range of other applications in addition to audio amplifiers. Whenever the consumer operated by a power supply with PFC function has a high dynamic response, by using this invention the stability of the internal operating voltage can be increased. Since in most cases electronic devices are nowadays controlled by digital control units, in many cases a suitable signal indicating the (future) power required by the consumer is available, which is fed back into the regulation of the PFC stage in an appropriate manner.

In accordance with the invention therefore, an improvement is obtained in the transient behavior of dynamically loaded PFC circuits in consumers, in particular audio amplifiers, by positive feedback of means of the output power, in particular of the amplifier.

BRIEF DESCRIPTION OF THE DRAWINGS

Other features, effects and advantages of the invention are derived from the following description of a preferred exemplary embodiment of the invention and from the accompanying figures. Shown is, in a schematic diagram.

DETAILED DESCRIPTION

Figure 1:
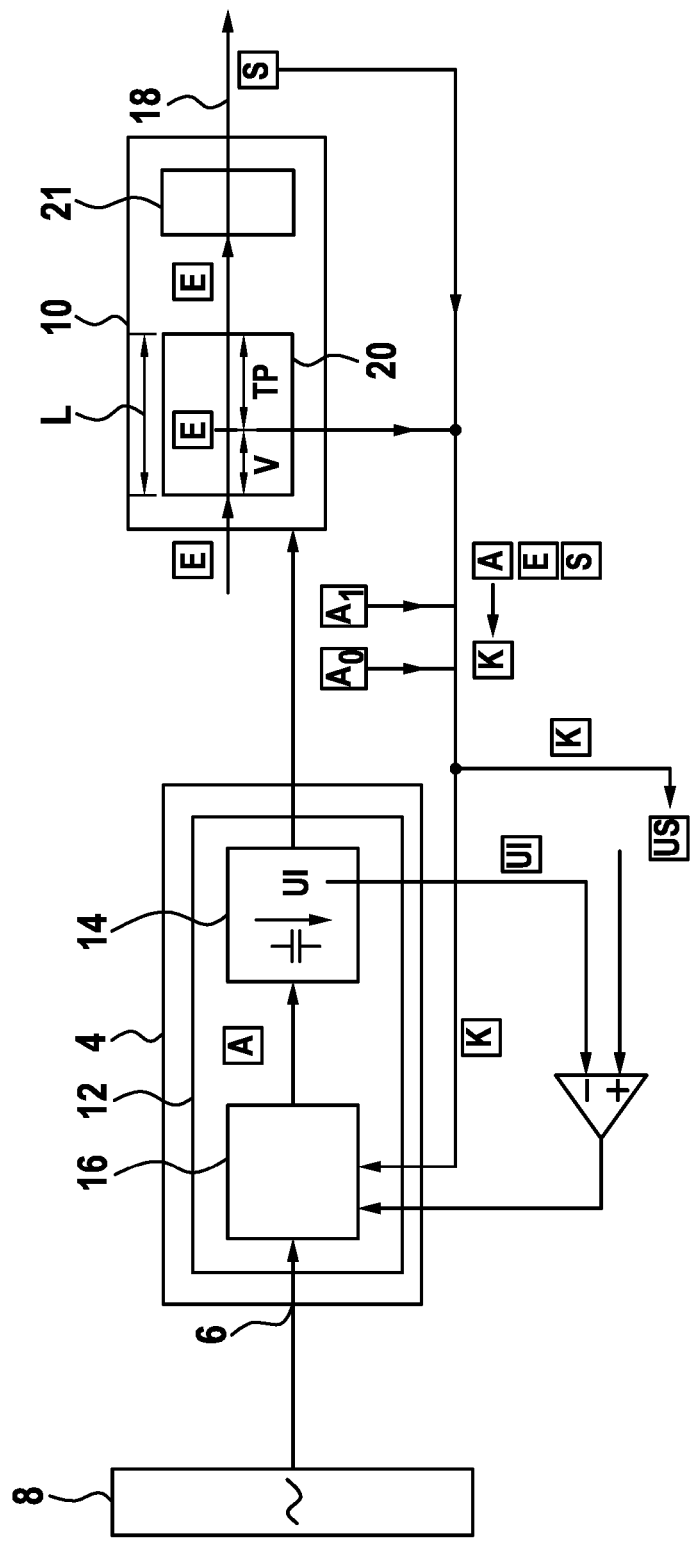
FIG. 1 a consumer arrangement according to the invention.

FIG. 1 shows a consumer arrangement 2 with a power supply 4. The power supply 4 has a power supply input 6, which is connected to a mains supply network 8. The mains supply 8 supplies alternating voltage, which is indicated by a wavy line. The consumer arrangement 2 also contains a consumer 10, which in the regular operation of the power supply 4 is supplied with an output power A (indicated symbolically). The power supply 4 contains a PFC module 12, which is connected to a mains power input 6 and contains a DC link 14. The DC link 14 is supplied with power or energy from the mains input 6 and provides the output power A. The PFC module 12 also contains a regulator 16, which feeds the DC link 14 with the output power A from the mains input 6 or regulates this supply of power. A characteristic parameter K correlated with the output power A required in the consumer 10 is fed back to the regulator 16.

Figure 2A:
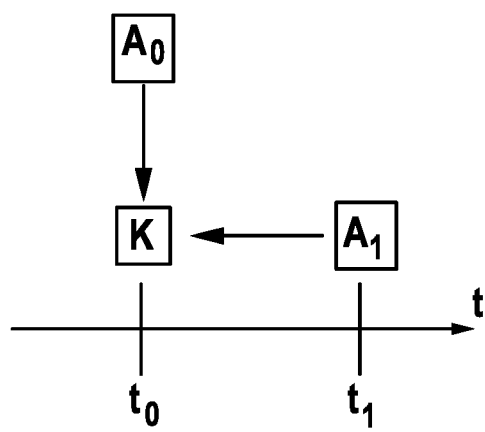
FIGS. 2a and 2b timing diagrams for parameters occurring in the consumer arrangement.

FIG. 2a shows a timing diagram, in which the time t is shown as a time line. A time t0 is marked.

For the simplest case, in FIG. 1 the output power A0 (currently) consumed by the consumer 10, which is actually required by the consumer 10 at time t0, is depicted. The characteristic parameter K is determined in this case from the current output power A0 at time t0 and is fed back to the regulator 16 at the same time t0 (delay times due to processing/signal cable, etc. are neglected here).

FIG. 1 also shows an alternative case: here it is already known at time t0 that the consumer will require an output power A1 at a later time t1. Consequently, a prediction time TP of 100 ms is obtained between t0 and t1 in the example. In this alternative case the characteristic parameter K (at time t0) is correlated with the expected future output power A1 and is fed to the regulator 16 at time t0. The corresponding timing conditions are shown alternatively in FIG. 2a. The regulator can now correct or pre-adjust its regulation behavior "in advance", i.e. predictively with a lead time equal to the prediction time TP, so that at time t1 the provision of the output power A1 is ensured and the PFC nevertheless continues to work optimally. This presupposes that at the current time t0, in each case the amount of power A1 that the consumer 10 will need at a future time t1—which is a prediction time TP after the current time t0—is known. In this case, the characteristic parameter K (used at time t0) is thus correlated with an expected demand of the consumer 10 for output power A1 in future (at time t1), after the expiry of a prediction time TP.

In the example, the correlation of the output power A with the characteristic parameter K is accomplished as follows: The consumer 10 has an input signal E, or is fed with such a signal. The consumer 10 is an amplifier arrangement, in this case an audio amplifier arrangement. The input signal E is an audio signal. The input signal E is a signal applied externally to the consumer 10, that is, from outside of the consumer arrangement 2, and in the example originates from a CD player. The consumer's 10 demand for output power A is correlated with the input signal E. The characteristic parameter K is then determined based on the input signal E. In the example, the input signal E is an input signal E which is completely known in advance a long time (hours) before time t0, namely an audio signal whose recording has been completed and which in this case is stored on an audio CD. From the audio signal and the characteristics of the amplifier, the power demand A is known for all playback times of the audio signal. In this context the characteristic parameter K at any time t0 is therefore already determined (a long time, for example, hours or minutes) before the actual times t0 at which the output power A is required in the consumer 10.

In the consumer 10, the input signal E is processed and output again as output signal S, which here is used to control or to operate speakers, not shown. The output signal S is thus the processed input signal E. To generate the instantaneous output signal S at time t0 or t1, the output powers A0 or A1, etc. are required. The characteristic parameter K in this case is thus correlated with the expected output power A of the processed input signal E.

Figure 2B:
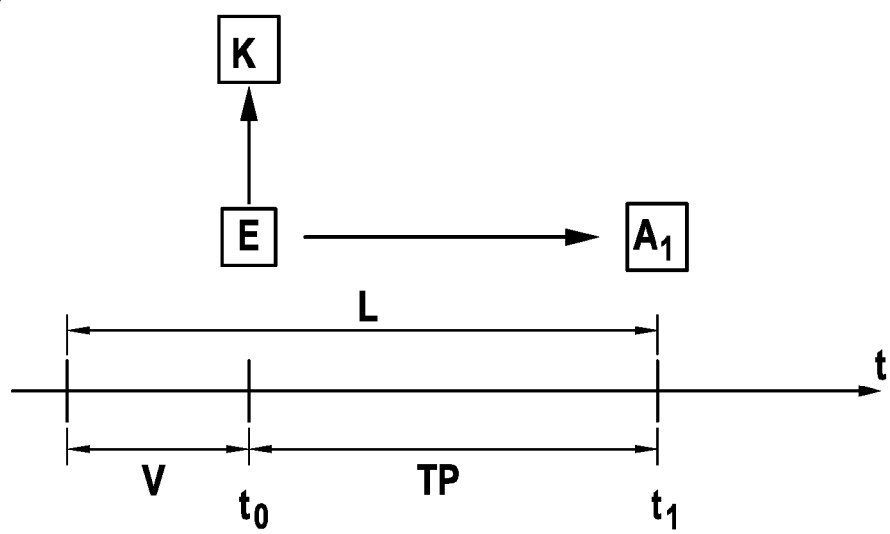

FIG. 1 shows a signal path 18, shown by an arrow, for the input signal E in the consumer 10. In this signal path 18 the consumer 10 includes a digital signal processor (DSP) 20. This has an internal transit time L, which the input signal E needs to travel from its input to its output. In other words, in the DSP 20 the input signal E is delayed by the transit time L. The future demand for power output A, which is correlated with the input signal E, is derived from the input signal E after a processing time V has already elapsed in the DSP 20, but where this time is not equal to the full transit time L. Therefore, the prediction time TP remaining is given by the transit time L minus the processing time V: The characteristic parameter K correlated with the output power A1 at time t1=t0+TP is thus known at time t0. FIG. 2b shows the corresponding timing conditions on the timeline of the time t. At the first time point the input signal E is fed into the DSP 20. At the later time t0, the characteristic parameter K is determined from the input signal E or else this is produced.

At time t1 the processed input signal E exits the DSP 20 and the output power A1 is required in the consumer 10 at time t1.

In an alternative embodiment (in FIG. 1 only indicated symbolically), the regulator 16 has a reference input 22a and an actual input 22b. A value correlated with the current actual voltage UI in the DC link 14 is fed to the actual input 22b. A value correlated with a reference voltage US is fed to the reference input 22a. The value of the reference voltage US is determined by means of the characteristic parameter K. (Indicated in FIG. 1 by an arrow).

In a method for operating the consumer arrangement 2 therefore, the procedure is as follows:

The mains input 6 is connected to the mains supply 8. The consumer 10 is connected to the power supply 4 and is supplied with the output power A from the power supply 4. The DC link 14 is fed from the mains input 6 and also provides the output power A. A characteristic parameter K is determined, which is correlated with the required output power A. The characteristic parameter K is fed back to the regulator 16. The different types of correlation of the output power A and characteristic parameter K have been explained above.

The invention claimed is:

1. A consumer arrangement (2), comprising
   a power supply (4) with a mains supply input (6), configured to be connected to an electricity supply (8) supplying an alternating voltage, and
   a consumer (10), which is connected to the power supply (4) and supplied with an output power (A) by the power supply (4),
   wherein the power supply (4) contains a PFC module (12) connected to the mains supply input (6) with a DC link (14), which is fed from the mains supply input (6) and which provides the output power (A),
   wherein the PFC module (12) contains a regulator (16) for supplying the DC link (14) with the output power (A) from the mains supply input (6),
   wherein a characteristic parameter (K) correlated with the output power (A) required by the consumer (10) is fed back to the regulator (16), and
   wherein the characteristic parameter (K) correlates with an expected future demand of the consumer (10) for output power (A) after a prediction time (TP) has elapsed.

2. The consumer arrangement (2) according to claim 1, characterized in that
   the regulator (16) has a reference input (22a) and an actual input (22b), wherein an actual value correlated with the current actual voltage (UI) in the DC link (14) is supplied to the actual input (22b) and a reference value correlated with a reference voltage (US) in the DC link (14) is supplied to the reference input (22a), wherein the reference value is determined on the basis of the characteristic parameter.

3. A consumer arrangement (2), comprising
   a power supply (4) with a mains supply input (6), configured to be connected to an electricity supply (8) supplying an alternating voltage, and
   a consumer (10), which is connected to the power supply (4) and supplied with an output power (A) by the power supply (4),
   wherein the power supply (4) contains a PFC module (12) connected to the mains supply input (6) with a DC link (14), which is fed from the mains supply input (6) and which provides the output power (A), wherein the PFC module (12) contains a regulator (16) for supplying the DC link (14) with the output power (A) from the mains supply input (6), wherein a characteristic parameter (K) correlated with the output power (A) required by the consumer (10) is fed back to the regulator (16), and wherein the consumer (10) has an input signal (E), and the demand of the consumer (10) for output power (A) is correlated with the input signal (E), wherein the characteristic parameter (K) is determined on the basis of the input signal (E).

4. The consumer arrangement (2) according to claim 3, characterized in that the input signal (E) is an input signal (E) of which at least some sections are known in advance before being fed to the consumer (10) and the characteristic parameter (K) is determined in advance from the previously known input signal (E).

5. The consumer arrangement (2) according to claim 3, characterized in that the input signal (E) is a signal which is fed to the consumer arrangement (2) externally.

6. The consumer arrangement (2) according to claim 3, characterized in that the consumer arrangement (2) is an amplifier arrangement, and the input signal (E) is a signal to be amplified.

7. The consumer arrangement (2) according to claim 3, characterized in that the characteristic parameter (K) is a characteristic parameter (K) which is correlated with an expected output signal (S) of the input signal (E) that is processed in the consumer (10).

8. The consumer arrangement (2) according to claim 3, characterized in that in a signal path (18) for the input signal (E) the consumer (10) contains a digital signal processor (20) with an internal transit time (L), and the future demand for output power (A) is determined from the input signal (E) which is at least not yet delayed by the full transit time (L).

9. A method for operating a consumer arrangement (2), having a power supply (4) with a mains supply input (6), which can be connected to an electricity supply (8) supplying an alternating voltage, and having a consumer (10), which is connected to the power supply (4) and supplied with an output power (A) by the power supply (4), wherein the power supply (4) contains a PFC module (12) connected to the mains supply input (6) with a DC link (14), which is fed from the mains supply input (6) and which provides the output power (A), and wherein the PFC module (12) contains a regulator (16) for supplying the DC link (14) with the output power (A) from the mains supply input (6), the method comprising feeding back to the regulator (16) a characteristic parameter (K) correlated with the output power (A) required by the consumer (10), wherein the characteristic parameter (K) correlates with an expected future demand of the consumer (10) for output power (A) after a prediction time (TP) has elapsed.

10. The method according to claim 9, characterized in that the consumer (10) has an input signal (E), and the demand of the consumer (10) for output power (A) is correlated with the input signal (E), wherein the characteristic parameter (K) is determined on the basis of the input signal (E).

11. The method according to claim 10, characterized in that the input signal (E) is an input signal (E) of which at least some sections are known in advance before being fed to the consumer (10) and the characteristic parameter (K) is determined in advance from the previously known input signal (E).

12. The method according to claim 10, characterized in that the input signal (E) is a signal which is fed to the consumer arrangement (2) externally.

13. The method according to claim 10, characterized in that the consumer arrangement (2) is an amplifier arrangement, and the input signal (E) is a signal to be amplified.

14. The method according to claim 10, characterized in that the characteristic parameter (K) is a characteristic parameter (K) which is correlated with an expected output signal (S) of the input signal (E) that is processed in the consumer (10).

15. The method according to claim 10, characterized in that in a signal path (18) for the input signal (E) the consumer (10) contains a digital signal processor (20) with an internal transit time (L), and the future demand for output power (A) is determined from the input signal (E) which is at least not yet delayed by the full transit time (L).

16. The method according to claim 9, characterized in that the regulator (16) has a reference input (22a) and an actual input (22b), wherein an actual value correlated with the current actual voltage (UI) in the DC link (14) is supplied to the actual input (22b) and a reference value correlated with a reference voltage (US) in the DC link (14) is supplied to the reference input (22a), wherein the reference value is determined on the basis of the characteristic parameter.

* * * * *